(12) United States Patent
Heyl

(10) Patent No.: US 11,587,009 B2
(45) Date of Patent: Feb. 21, 2023

(54) RISK-BASED ASSESSMENT OF PASSENGER TRANSFER

(71) Applicant: Robert Bosch GmbH, Stuttgart (DE)

(72) Inventor: Andreas Heyl, Sunnyvale, CA (US)

(73) Assignee: Robert Bosch GmbH, Stuttgart (DE)

( * ) Notice: Subject to any disclaimer, the term of this patent is extended or adjusted under 35 U.S.C. 154(b) by 549 days.

(21) Appl. No.: 16/587,287

(22) Filed: Sep. 30, 2019

(65) Prior Publication Data

US 2021/0012253 A1    Jan. 14, 2021

Related U.S. Application Data

(60) Provisional application No. 62/871,910, filed on Jul. 9, 2019.

(51) Int. Cl.
*G06Q 10/06* (2012.01)
*G08G 1/01* (2006.01)
*G06Q 10/0635* (2023.01)

(52) U.S. Cl.
CPC .......... *G06Q 10/0635* (2013.01); *G08G 1/01* (2013.01)

(58) Field of Classification Search
CPC ...... G06Q 10/0635; G06Q 50/30; G08G 1/01; G08G 1/202
See application file for complete search history.

(56) References Cited

U.S. PATENT DOCUMENTS 9,547,307 B1 *    1/2017    Cullinane .............. G01C 21/26

* cited by examiner

*Primary Examiner* — Jeff A Burke
*Assistant Examiner* — Sihar A Karwan
(74) *Attorney, Agent, or Firm* — David Kovacek; Maginot, Moore & Beck LLP

(57) ABSTRACT

A system and method for assessment of risk involved in transfer of passengers into or out of a vehicle at a particular transfer location. The assessment may utilize environmental data and dynamic data to estimate a risk level for the passengers. If the estimated risk level is not lower than a threshold, a revised transfer location may be found and assessed.

20 Claims, 3 Drawing Sheets

RISK-BASED ASSESSMENT OF PASSENGER TRANSFER

TECHNICAL FIELD

This disclosure relates to commercial passenger vehicles and transfer of passengers into and out of the commercial passenger vehicles.

BACKGROUND

Commercial passenger vehicles transport passengers between a starting location and a destination. Passengers must transfer into the commercial passenger vehicle at the beginning of a trip and must transfer out at the end of the trip. Transfers into and out of the commercial passenger vehicle may occur within uncontrolled environments, and as such may be subjected to potentially dangerous or inconvenient conditions.

SUMMARY

One aspect of this disclosure is directed to a transfer-risk assessment system associated with a vehicle and operable to assess the risk associated with a passenger transferring into or out of the vehicle at a particular location. The sensor may comprise a processor, a number of sensors in data communication with the processor, and a memory comprising instructions executable by the processor. The sensors may comprise a position sensor operable to indicate a location of the vehicle with respect to a surrounding environment. The sensors may further be operable to acquire environmental data describing static conditions of the environment and dynamic data describing changing conditions of the environment. The sensors may further be operable to acquire dynamic data describing the conditions of moving bodies within the environment. The memory may comprise instructions that when executed by the processor cause the processor to determine an initial transfer location based upon proximity to a travel endpoint, capture data from the sensors, generate a risk estimate based upon the sensor data, and then either confirm or revise the transfer location based upon the risk estimate.

A second aspect of this disclosure is directed to a method of selecting a transfer location for a passenger to enter or exit a vehicle near a travel endpoint. The method may comprise the steps of generating an initial transfer location based at least in part upon proximity to the travel endpoint, acquiring data describing static and dynamic conditions of the environment surrounding the transfer location, generating a risk estimate associated with the transfer location, and either confirming or revising the transfer location based upon the risk estimate.

A further aspect of this disclosure is directed to a non-transitory computer-readable medium comprising instructions stored thereupon which when executed by a processor cause the processor to perform a method having the steps of generating an initial transfer location based at least in part upon proximity to the travel endpoint, acquiring data describing static and dynamic conditions of the environment surrounding the transfer location, generating a risk estimate associated with the transfer location, and either confirming or revising the transfer location based upon the risk estimate.

The above aspects of this disclosure and other aspects will be explained in greater detail below with reference to the attached drawings.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
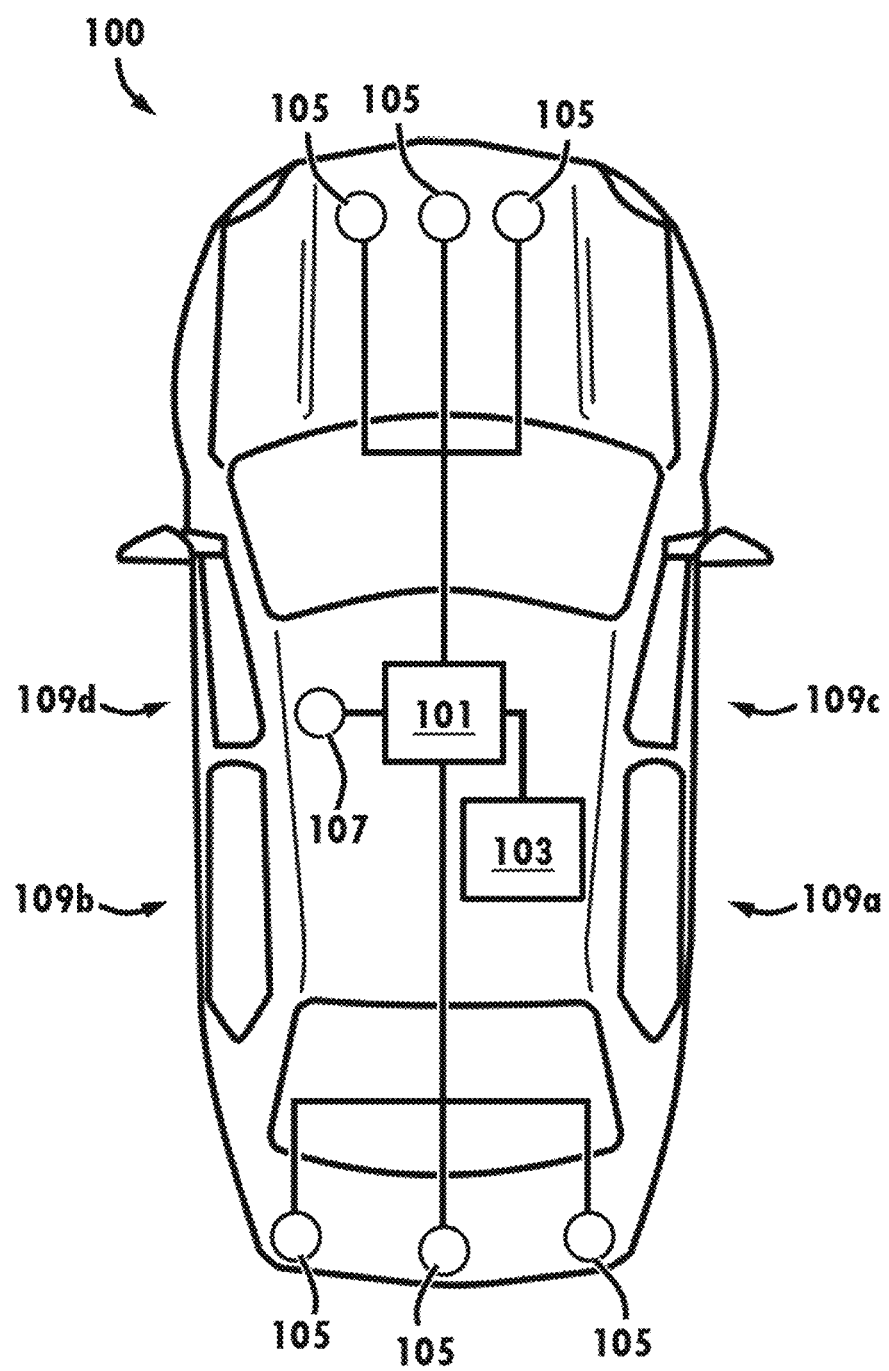
FIG. 1 is a diagrammatic illustration of a vehicle having a transfer risk-assessment system.

FIG. 1 shows a diagrammatic illustration of a vehicle 100 having a transfer-risk assessment system associated therewith. The system may comprise a processor 101 and a memory 103. Processor 101 may be embodied as a mobile processing device, a smartphone, a tablet computer, a laptop computer, a wearable computing device, a desktop computer, a personal digital assistant (PDA) device, a handheld processor device, a specialized processor device, a system of processors distributed across a network, a system of processors configured in wired or wireless communication, or any other alternative embodiment known to one of ordinary skill in the art.

Memory 103 may comprise computer-executable instructions operable for execution by processor 101. Computer-executable instructions may include instructions and data which cause a general purpose computer, special purpose computer, or special purpose processing device to perform a certain function or group of functions. Computer-executable instructions may also include program modules that are executed by computers in stand-alone or network environments. Program modules may include routines, programs, objects, components, or data structures that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps. Memory 103 may be embodied as a non-transitory computer-readable storage medium or a machine-readable medium for carrying or having computer-executable instructions or data structures stored thereon. Such non-transitory computer-readable storage media or machine-readable medium may be any available media embodied in a hardware or physical form that can be accessed by a general purpose or special purpose computer. By way of example, and not limitation, such non-transitory computer-readable storage media or machine-readable medium may comprise random-access memory (RAM), read-only memory (ROM), electrically erasable programmable read-only memory (EEPROM), optical disc storage, magnetic disk storage, linear magnetic data storage, magnetic storage devices, flash memory, or any other medium which can be used to carry or store desired program code means in the form of computer-executable instructions or data structures. Combinations of the above should also be included within the scope of the non-transitory computer-readable storage media or machine-readable medium.

The system may comprise a number of sensors 105. Sensors 105 may be operable to detect conditions of the environment surrounding vehicle 100. Sensors 105 may be operable to generate environmental data describing static conditions of the environment and dynamic data describing changing conditions of the environment or conditions of bodies in motion within the environment. Sensors 105 may comprise radar sensors, lidar sensors, ultraviolet sensors, infrared sensors, camera sensors, vibration sensors, microphonic sensors, temperature sensors, humidity sensors, water sensors, proximity sensors, or any other sensor known to one of ordinary skill in the art at the time the invention was made. In the depicted embodiment, sensors 105 comprise a plurality of sensors arranged at different points with respect to vehicle 100, but other embodiments may comprise other configurations without deviating from the teachings disclosed herein. In some embodiments, individual sensors 105 may be distinct from each other without deviating from the teachings disclosed herein. In some embodiments, each of sensors 105 may comprise identical configurations without deviating from the teachings disclosed herein.

Sensors 105 may be operable to generate environmental data describing static conditions of the environment. Environmental data may comprise known static conditions of the environment, such as road boundaries, lane positions, signage, crosswalk positions, intersection positions, traffic rules, speed limits, building locations, building addresses, or other known conditions of an environment surrounding vehicle 100 without deviating from the teachings disclosed herein. In some embodiments, environmental data may be compared to high-density map data stored in a memory, such as memory 103. Environmental data may comprise static conditions that are not known, but can be determined during operation of the system to be pertinent to the navigation of a vehicle. Such static conditions may comprise the presence of potholes, road barricades, temporary signage, puddles, ice, debris, road blockages, fallen trees, fallen signage, downed power lines, or other static conditions recognized by one of ordinary skill in the art to be pertinent to navigating the environment without deviating from the teachings disclosed herein.

Sensors 105 may be operable to generate dynamic data describing dynamic conditions of the environment. Such dynamic data may comprise weather conditions, traffic light statuses, position of movable barricades, conditions of street lighting, wind, or any other dynamic conditions recognized by one of ordinary skill in the art without deviating from the teachings disclosed herein. Dynamic data may also described the status, position, and motion of moving bodies within the environment, such as other vehicles, cyclists, pedestrians, wild animals, pets, or any other moving body within the environment without deviating from the teachings disclosed herein.

The system may additionally comprise a position sensor 107 operable to generate data indicating the position of the vehicle with respect to map data or global positioning data. The map data may comprise high-density map data having details describing the environment and expected traffic conditions stored in a memory, such as memory 103. Global positioning data may be utilized to navigate the vehicle with respect to a global navigation satellite system (GNSS) such as a global positioning system (GPS).

Vehicle 100 may comprise a commercial passenger vehicle. Vehicle 100 may comprise an autonomous driving function, a partially-autonomous driving function, a driver-assistance function, or a navigation-assistance function without deviating from the teachings disclosed herein. Vehicle 100 may be operable to drive to a location suitable for the pick-up or drop-off of one or more passengers. Such positions may be called "transfer locations" where transfer of passengers in or out of the vehicle may be accomplished. Transfer of passengers may comprise boarding or entrance of the passenger into the vehicle, or egress or exit of the passengers out of the vehicle. Vehicle 100 may comprise a number of portals 109 for the purpose facilitating passenger transfers. In the depicted embodiment, vehicle 100 comprises four portals 109 in the form of doors suitable for passenger entrance/exit, but other embodiments may comprise other portal configurations without deviating from the teachings disclosed herein. Some embodiments may have a different number of portals 109 without deviating from the teachings disclosed herein. In some embodiments, portals may have selectively openable portals without deviating from the teachings disclosed herein. In some embodiments, portals may not comprise doors without deviating from the teachings disclosed herein.

The system may permit vehicle 100 to facilitate transfer of a vehicle at a transfer location near and endpoint of navigation for the vehicle. Endpoints of navigation may comprise a departure location or a destination location. Some navigation routes may comprise multiple endpoints for multi-segment navigation without deviating from the teachings disclosed herein. The system may permit vehicle 100 to approach an endpoint and determine an initial transfer location based upon proximity to the endpoint. As vehicle 100 approaches the initial transfer location, sensors 105 may provide environmental data and dynamic data describing the conditions in the vicinity of the initial transfer location and more generally near the endpoint.

The acquired environmental data and dynamic data may be utilized as inputs to a risk-analysis by processor 101 to generate a risk estimate. The risk estimate may indicate a rating of the level of danger or inconvenience. In some embodiments, the risk estimate may indicate different levels of danger and inconvenience without deviating from the teachings disclosed herein. If the risk estimate is determined to be higher than a threshold value, the risk is considered too great and vehicle 100 should be directed to a different transfer location. A revised transfer location may then be determined based upon proximity to the endpoint, but also a second risk estimate generated by a risk analysis utilizing environmental data and dynamic data from sensors 105. In some embodiments, the environmental data or the dynamic data may be updated prior to the second risk analysis. In some embodiments, different weighting may be utilized to give more emphasis to the proximity or the risk estimate in determination of revised transfer location without deviating from the teachings disclosed herein. By way of example and not limitation, an egress transfer may utilize a higher weight associated with the second risk estimate because the passengers are already within the vehicle, whereas a boarding transfer may place less emphasis on the second risk estimate in order to enhance convenience for a passenger waiting to be picked up.

Figure 2:
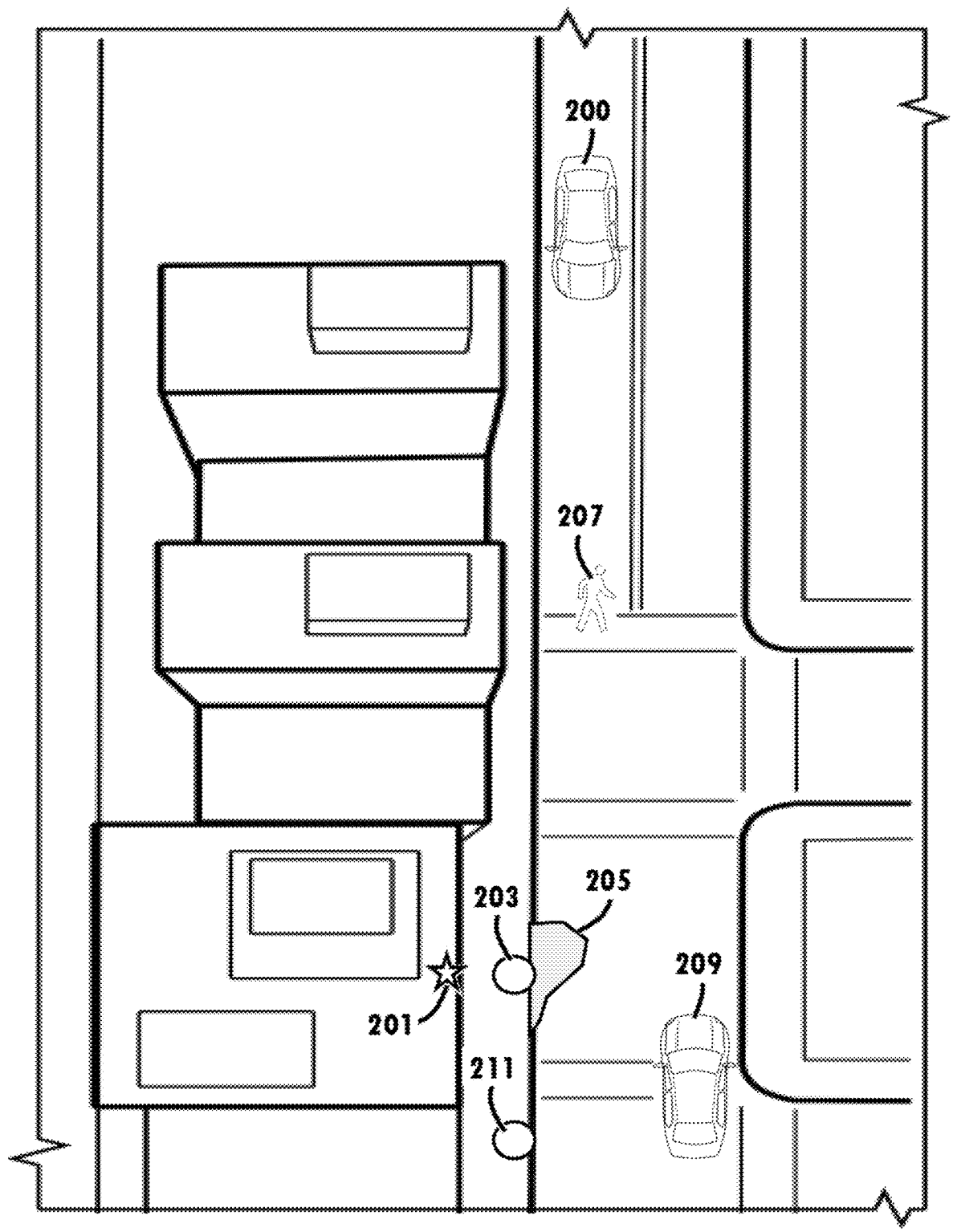
FIG. 2 is an exemplary illustration of a scenario during operation of a transfer risk-assessment associated with a vehicle.

FIG. 2 provides a diagrammatic illustration of an exemplary scenario of operation of a vehicle 200 having a risk-assessment system according to one embodiment of the invention. In the depicted embodiment, vehicle 200 may be identical to vehicle 100, but other embodiments may comprise other configurations without deviating from the teachings disclosed herein. In the depicted embodiment, the transfer may be directed an egress transfer, but other embodiments may comprise a different munber of transfers having different types without deviating from the teachings disclosed herein.

In the depicted embodiment, vehicle 200 may be navigating toward a destination 201, which is utilized as a navigational endpoint in determining an initial transfer location 203. Because this transfer is directed to an egress, initial transfer location 203 may synonymously be referred to as an egress location. In other embodiments, transfer locations may be referred to as boarding locations or egress locations based upon the type of transfer anticipated without deviating from the teachings disclosed herein. For multi-segment navigation or multi-stage transfers, individual transfer locations may comprise both an egress location for some passengers and a boarding location for other passengers without deviating from the teachings disclosed herein. In some embodiments, a single passenger utilizing the same vehicle may make use of a transfer location as both an egress location and a boarding location, such as when running errands, without deviating from the teachings disclosed herein.

Initial transfer location 203 may initially be determined based on proximity to destination 201. However, in the depicted embodiment, a puddle 205 presents a situational hazard for a passenger to egress from vehicle 200. Vehicle 200 may detect the condition and dimensions of the puddle 205 in close proximity to initial transfer location 203 utilizing sensors operable to generate environmental data or dynamic data, such as sensors 105 (see FIG. 1). A risk analysis may be performed by a processor associated with vehicle 200 and in data communication with the associated sensors, such as processor 101 (see FIG. 1). If the risk analysis yields a risk estimate that is higher than a threshold, a revised transfer location is selected.

In the depicted embodiment, the revised transfer location is selected utilizing environmental data describing the static conditions of the depicted environment, and dynamic data describing dynamic conditions of the depicted embodiment. Environmental data may describe the layout of the street, lane markings, traffic rules, and the condition and dimensions of puddle 205 or other risk-associated static conditions of the environment. Dynamic data may describe the present conditions of traffic signals, the behavior of moving bodies within the environment such as a pedestrian 207 or other vehicle 209, or any other risk-associated dynamic conditions of the depicted environment.

Utilizing both proximity to destination 201 and the generated environmental data and dynamic data, a revised transfer location 211 may be determined that is suitably close to destination 201 without presenting a risk estimate higher than a threshold. Vehicle 200 may then navigate toward revised transfer location 211 and permit the passenger to egress.

Different environmental conditions may have different levels of influence on the risk analyses with respect to a transfer location. In the depicted embodiment, puddle 205 may have a smaller overall influence on the risk estimate than other conditions deemed more dangerous, such as potholes, road construction, downed power lines, or other risk-associated conditions of the environment.

In some embodiments, risk assessments may consider risk to people or things other than passengers. For example, if pedestrian 207 is moving toward a transfer location, the analysis may determine that the risk is greater when vehicle 200 must pass by the pedestrian 207, and forego a possible transfer location in the immediate vicinity. Other embodiments may comprise analyses suited to other conditions or individuals detected in the environment without deviating from the teachings disclosed herein.

In some embodiments, the dynamic data may be utilized to create a dynamic risk estimate, which changes based upon changes in the dynamic data or predicted changes in the dynamic data. For example, if vehicle 200 comprises a number of passengers requiring egress, and some much utilize a vehicle portal that places them in the street, the risk estimate may be higher while vehicle 200 is within close proximity to other vehicle 209, and may decrease if other vehicle 209 leaves the immediate vicinity. In some such embodiments, vehicle 200 may comprise an indicator for passengers that provides details of when the risk level is appropriate for transfer. Such indicators may comprise a display, a visual indicator, or an audible indicator operable to inform passengers when the estimated risk is below a threshold (indicating predicted safety of the transfer within specification), or when the estimated risk is above the threshold (indicating predicted risk of the transfer). In some embodiments, these indicators may comprise a timer or countdown provided to a passenger, indicating a window of time when a transfer is appropriate or until a timer is appropriate. In some embodiments, if a transfer is not successful during a designated time window, vehicle 200 may be operable to seek out a revised transfer location that is associated with a risk estimate below the threshold value. In some such embodiments, a partial transfer (e.g., some but not all of a group of co-passengers) may be completed within the window, and the associated vehicle may be operable to either wait until the estimated risk is below the threshold, or navigate to a new transfer location with suitably low risk.

Figure 3:
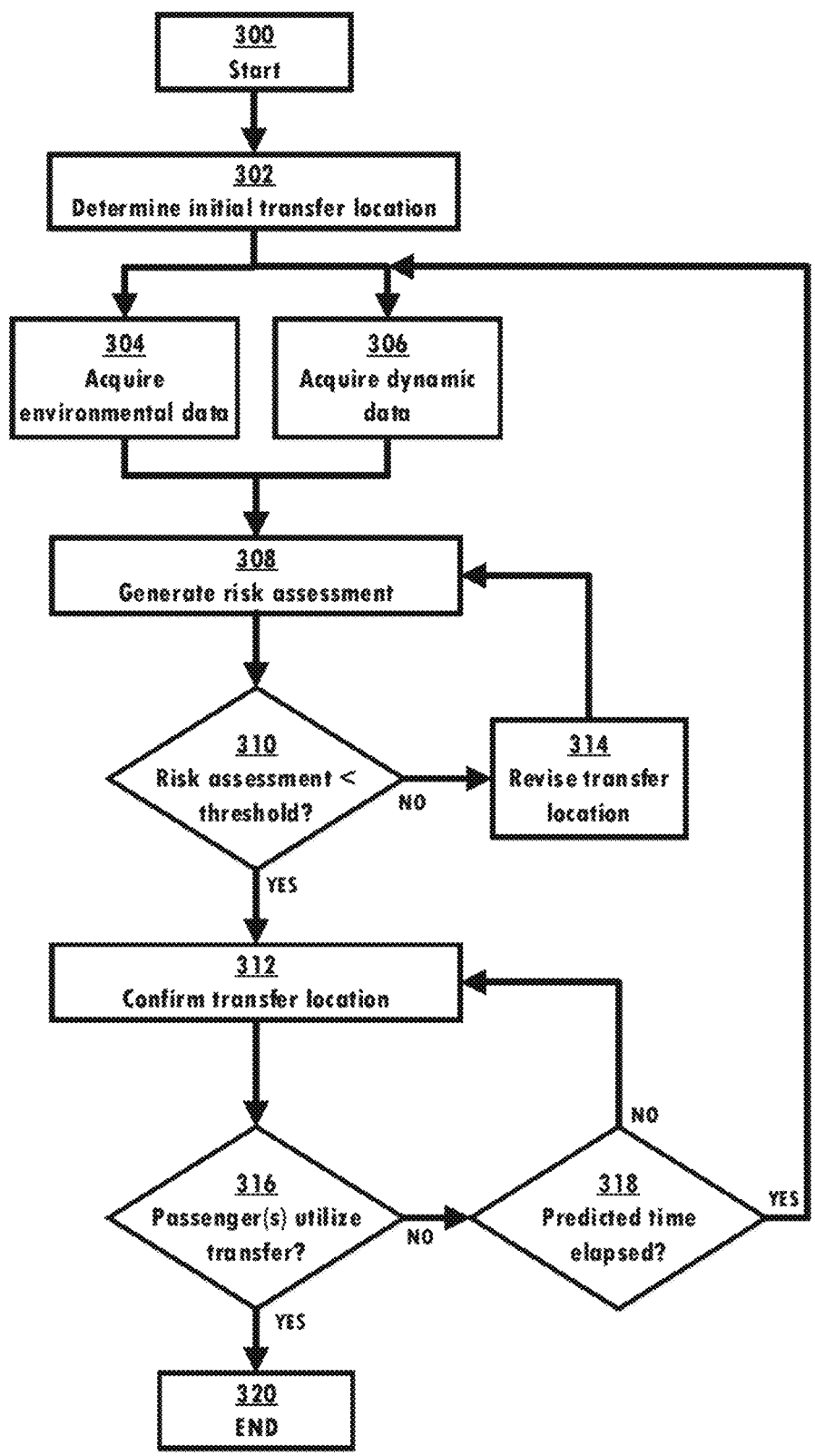
FIG. 3 is a flowchart illustrating a method of transfer risk-assessment according to an embodiment of the teachings disclosed herein.

FIG. 3 is a flowchart depicting steps of a method of selecting and utilizing a transfer location for a passenger of a vehicle. The method begins at step 300 during normal operation of a vehicle having a transfer-risk assessment system, such as the system depicted herein. At step 302, an initial transfer location is determined based on proximity to a navigation endpoint. At step 304, environmental data is acquired describing static conditions of the environment near the initial transfer location. At step 306, dynamic data is acquired describing dynamic conditions of the environment and statuses of moving bodies within the environment. In the depicted embodiment, steps 304 and 306 are performed concurrently, but other embodiments may comprise sequential operations in any order without deviating from the teachings disclosed herein. The environmental data and dynamic data may be acquired by sensors associated with the vehicle, such as sensors 105 (see FIG. 1), but other embodiments may comprise other sensors without deviating from the teachings disclosed herein.

After environmental data and dynamic data are acquired, the method may proceed to step 308, where a risk assessment is generated to provide a risk estimate of a transfer of passengers at the initial transfer location based upon the environmental data and the dynamic data. If the estimated risk is determined to be below a threshold value at step 310, the initial transfer location may be confirmed at step 312 and utilized for transfer of passengers.

If the risk estimate is determined to be equal to or greater than a threshold value, the method proceeds to step 314, wherein a revised transfer location is selected. After selection of the revised transfer location, the method returns to step 308 to generate a risk assessment based upon the revised transfer location. In some embodiments, the method may instead return to one or both of steps 304 or 306 in order to update the environmental data or the dynamic data for use in the revised risk assessment without deviating from the teachings disclosed herein. The method may continue to reject the revised transfer location at 310 until a risk assessment is completed with an associated risk estimate below the threshold value. If a revised transfer location also results in a risk estimate above the threshold in step 310, the method may continue again to step 312 for another different revised transfer location. This loop may be operationally stable until such time that the risk assessment generates a risk estimate below the threshold value.

After a transfer location is confirmed at step 312, the system may wait until one or more passengers associated with the vehicle complete a transfer into or out of the vehicle at step 316. In the depicted embodiment, a time window may be defined predicting a length of time for the risk estimate to remain valid. The system monitors whether the time has elapsed at step 318, if the passengers have not yet transferred and the time has not elapsed, the method returns to step 312 and the system continues to assess whether the passenger or passengers have completed the transfer. If the window of time has elapsed, the method returns to steps 304 and 306 to update the environmental data and the dynamic data for reassessment of the current transfer location at step 308. In some embodiments, the method may instead utilize the existing environmental data and dynamic data, and instead return to step 314 without deviating from the teachings disclosed herein. If the total number of passengers utilize the transfer location at step 316, the method may end at step 320. In some embodiments, the method may restart at step 300 without deviating from the teachings disclosed herein.

While exemplary embodiments are described above, it is not intended that these embodiments describe all possible forms of the disclosed apparatus and method. Rather, the words used in the specification are words of description rather than limitation, and it is understood that various changes may be made without departing from the spirit and scope of the disclosure as claimed. The features of various implementing embodiments may be combined to form further embodiments of the disclosed concepts.

What is claimed is:

1. An transfer-risk assessment system associated with an autonomous vehicle, the system comprising:
    a processing system including a processor disposed at least partially within the autonomous vehicle;
    a number of sensors associated with the autonomous vehicle and in data communication with the processor, the number of sensors comprising at least a camera sensor and a proximity sensor and operable to acquire environmental data describing static conditions of an environment surrounding the autonomous vehicle and dynamic data describing changing conditions of the environment and conditions of moving bodies within the environment;
    a position sensor in data communication with the processor and operable to indicate a location of the autonomous vehicle with respect to the environment; and
    a memory in data communication with the processor and operable to store instructions executable by the processor,
    wherein the memory further comprises instructions that when executed by the processor, cause the processor to generate first coordinate data describing an initial transfer location chosen based upon a proximity to a travel endpoint of the autonomous vehicle, acquire environmental data and dynamic data from the number of sensors, generate a first risk estimate associated with the initial transfer location based on a risk-analysis completed utilizing the environmental data and dynamic data, generate second coordinate data describing a revised transfer location, the second coordinate data being identical to the first coordinate data when the first risk estimate is below a threshold value and otherwise the revised transfer location chosen based upon proximity to the travel endpoint, the second transfer locations suitability as an egress location, and a second risk estimate associated with the revised transfer location and less than or equal to the threshold value, the second risk estimate on a risk-analysis completed utilizing the environmental data and dynamic data and a different weighting of the proximity and the second risk estimate than determination of the first coordinates, and directing the autonomous vehicle to the first coordinates when the first risk estimate is below the threshold value and to the second coordinates otherwise.

2. The system of claim 1, wherein the memory further comprises instructions that when executed by the processor, cause the processor to update the second risk estimate in response to changes in the dynamic data.

3. The system of claim 2, further comprising a display in data communication with the processor, and the memory further comprises instructions that when executed by the processor cause the processor to update the display with an indication of a risk-analysis result.

4. The system of claim 3, wherein the indication of the risk-analysis result comprises a timer indicating a window of time wherein second risk estimate is predicted to be below the threshold value.

5. The system of claim 4, wherein the memory further comprises instructions that when executed by the processor cause the processor to generate third coordinate data describing a second revised transfer location in response to the window of time expiring without a passenger exiting or entering the autonomous vehicle at the revised transfer location, the third coordinate data chosen based upon proximity to the travel endpoint and a third risk estimate associated with the second revised transfer location, the third risk estimate based on a risk-analysis completed utilizing the environmental data and the dynamic data.

6. The system of claim 1, wherein the autonomous vehicle comprises a plurality of exits, and the risk-analysis generates an indication of which exit comprises a lowest risk estimate based on the environmental data and the dynamic data.

7. The system of claim 1, wherein the risk-analyses generate an indication of risk to a traffic participant other than a passenger of the autonomous vehicle.

8. A method of selecting a transfer location for a passenger to exit or enter a autonomous vehicle near a travel endpoint, the method comprising:
    generating first coordinates describing an initial transfer location chosen based upon a proximity to the travel endpoint;
    acquiring environmental data from a sensor array associated with the autonomous vehicle, the sensor array comprising at least a camera sensor and a proximity sensor, the environmental data describing static conditions of an environment surrounding the initial transfer location;

acquiring dynamic data from the sensor array, the dynamic data describing changing conditions of the environment and conditions of moving bodies within the environment;

generating a first risk estimate associated with the initial transfer location based on a risk-analysis completed utilizing the environmental data and the dynamic data;

generating second coordinates describing a revised transfer location; and directing the autonomous vehicle to the second coordinates, wherein the second coordinates are identical to the first coordinates when the first risk estimate is below a threshold value and otherwise the second coordinates describe a second transfer location chosen based upon proximity to the travel endpoint, the second transfer location's suitability as an egress location, and a second risk estimate associated with the revised transfer location, the second risk estimate based on a risk-analysis completed utilizing the environmental data and the dynamic data and having a value below the threshold value, wherein the determination of the second coordinates utilizes a different weighting of the proximity and the second risk estimate than determination of the first coordinates.

9. The method of claim 8, wherein the generating second coordinates comprises updating the second risk estimate in response to changes in the dynamic data.

10. The method of claim 9, further comprising updating a display with an indication of a risk-analysis result.

11. The method of claim 10, wherein the indication of the risk-analysis result comprises a timer indicating a window of time wherein a risk estimate is predicted to be below the threshold value.

12. The method of claim 11, further comprising generating third coordinate data describing a second revised transfer location in response to the window of time expiring without a passenger exiting or entering the autonomous vehicle, the third coordinate data chosen based upon proximity to the travel endpoint and a third risk estimate associated with the second revised transfer location, the third risk estimate based on a risk-analysis completed utilizing the environmental data and the dynamic data.

13. The method of claim 8, wherein the risk-analysis generates an indication of which exit of the autonomous vehicle comprises a lowest estimated risk based on the environmental data and the dynamic data.

14. The method of claim 8, wherein the risk-analysis comprises an indication of risk to a traffic participant other than a passenger of the autonomous vehicle.

15. A non-transitory computer-readable storage medium having instructions stored thereon that when executed by a processor, cause the processor to perform a method of selecting a transfer location for a passenger to enter or exit a autonomous vehicle and directing the autonomous vehicle to the transfer location, the method having the steps of:

generating first coordinates describing an initial transfer location chosen based upon a proximity to a travel endpoint;

acquiring environmental data from a sensor array, the environmental data describing static conditions of an environment surrounding the initial transfer location;

acquiring dynamic data from the sensor array, the dynamic data describing changing conditions of the environment and conditions of moving bodies within the environment;

generating a first risk estimate associated with the initial transfer location based on a risk-analysis completed utilizing the environmental data and the dynamic data;

generating second coordinates describing a revised transfer location; and directing the autonomous vehicle to the second coordinates, wherein the second coordinates are identical to the first coordinates when the first risk estimate is below a threshold value and otherwise the second coordinates describe a second transfer location chosen based upon proximity to the travel endpoint, the second transfer location's suitability as an egress location, and a second risk estimate associated with the revised transfer location, the second risk estimate based on a risk-analysis completed utilizing the environmental data and the dynamic data and having a value below the threshold value, wherein the determination of the second coordinates utilizes a different weighting of the proximity and the second risk estimate than determination of the first coordinates.

16. The non-transitory computer-readable storage medium of claim 15, further comprising instructions wherein the generating second coordinates comprises updating the second risk estimate in response to changes in the dynamic data.

17. The non-transitory computer-readable storage medium of claim 16, further comprising instructions that when executed by a processor cause the processor to update a display with an indication of a risk-analysis result.

18. The non-transitory computer-readable storage medium of claim 17, further comprising instructions wherein the indication of the risk-analysis result comprises a timer indicating a window of time predicted to be safest for utilization of the revised transfer location.

19. The non-transitory computer-readable storage medium of claim 17, wherein the indication of the risk-analysis result comprises a timer indicating a window of time wherein a risk estimate is predicted to be below the threshold value.

20. The non-transitory computer-readable storage medium of claim 15, wherein the risk-analysis comprises an indication of risk to a traffic participant other than a passenger of the autonomous vehicle.

* * * * *